(12) United States Patent
Moustafa et al.

(10) Patent No.: US 11,151,866 B2
(45) Date of Patent: Oct. 19, 2021

(54) ENHANCED HIGH DEFINITION MAPS FOR A VEHICLE

(71) Applicant: Intel Corporation, Santa Clara, CA (US)

(72) Inventors: Hassnaa Moustafa, Portland, OR (US); Subramanian Anandaraj, Chandler, AZ (US); Ana Lucia Pinheiro, Hillsboro, OR (US); Patricia Robb, Crystal Lake, IL (US); Jithin Sankar Sankaran Kutty, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 291 days.

(21) Appl. No.: 16/267,648

(22) Filed: Feb. 5, 2019

(65) Prior Publication Data
US 2019/0244517 A1    Aug. 8, 2019

(51) Int. Cl.
*G08G 1/01*   (2006.01)
*G01C 21/32*  (2006.01)
*G06F 16/29*  (2019.01)
*G06F 16/23*  (2019.01)

(52) U.S. Cl.
CPC ........... *G08G 1/0141* (2013.01); *G01C 21/32* (2013.01); *G06F 16/23* (2019.01); *G06F 16/29* (2019.01); *G08G 1/0112* (2013.01)

(58) Field of Classification Search
CPC .... G08G 1/0141; G08G 1/0112; G06F 16/23; G06F 16/29; G01C 21/32
See application file for complete search history.

(56) References Cited

U.S. PATENT DOCUMENTS

2019/0220678 A1\*  7/2019  Guo .................... G06K 9/6218

\* cited by examiner

*Primary Examiner* — Brian P Sweeney
(74) *Attorney, Agent, or Firm* — Schwegman Lundberg & Woessner, P.A.

(57) ABSTRACT

System and techniques for enhanced electronic navigation maps for a vehicle are described herein. A set of map tiles may be received at a vehicle component from a remote entity. Sensor derived data that has a locality corresponding to a map tile in the set of map tiles may be obtained. A field-programmable gate array of the vehicle may then be invoked to combine the sensor derived data and the map tile to create a modified map tile. The modified map tile may be communicated to a control system of the vehicle.

24 Claims, 7 Drawing Sheets

ENHANCED HIGH DEFINITION MAPS FOR A VEHICLE

TECHNICAL FIELD

Embodiments described herein generally relate to electronic navigation maps for autonomous vehicle control and more specifically to high definition (HD) maps for a vehicle.

BACKGROUND

Electronic navigation maps for vehicles support autonomous, semi-autonomous, and driver assisted vehicle systems. These maps generally provide information about motorways-such as geographical position, road edge (e.g., curb) positions, traffic control elements (e.g., signs, speed limit, semaphores, etc.)—that are used by vehicle components (e.g., navigation or control systems) to pilot the vehicle, or to assist an operator in piloting the vehicle, on the motorway.

The electronic navigation maps are often divided into segments called tiles. Segmenting the maps reduces the resources a vehicle component needs to store the maps by enabling the vehicle component to acquire only those tiles relevant to a given road segment (e.g., few miles). Often, the tiles are obtained (e.g., downloaded or pushed) from a cloud service. In some cases, however, the tiles may be obtained from more local sources (e.g., at a cloud edge or fog), such as other vehicles or road side units (RSU). Various radio access technologies (RATs) may be used to deliver map tiles. In some wireless deployments, heterogeneous wireless networks may use of a mix of longer range and more reliable yet slower lower-frequency RATs and less reliable shorter range high-throughput RATs, such as millimeter wave based carrier signals.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
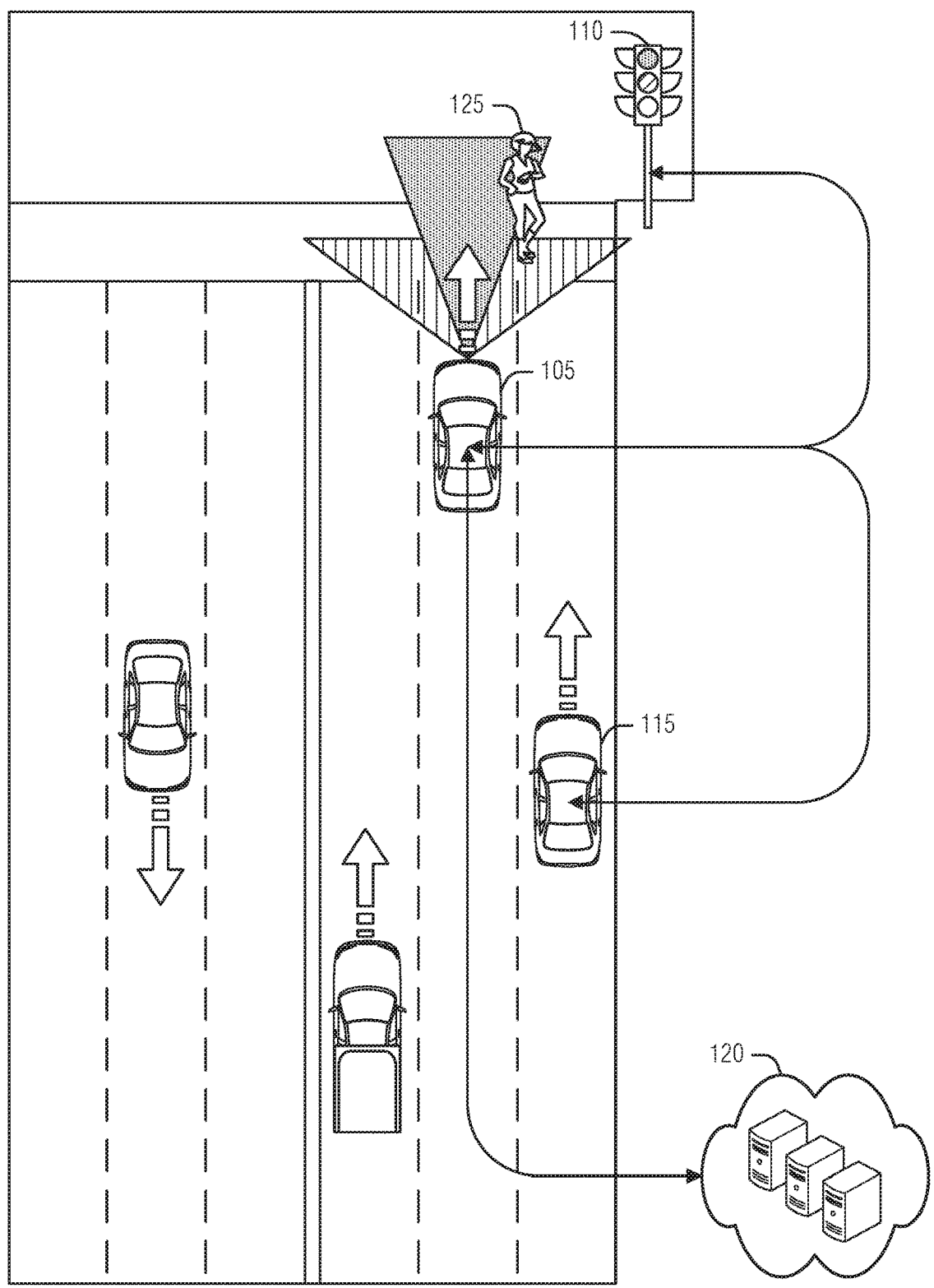
FIG. 1 is a block diagram of an example of an environment including a vehicle, an RSU, and a cloud service, according to an embodiment.

Electronic navigation maps may come in a variety of detail levels. Lower detail levels (e.g., low-definition (LD) maps) may be used for driver assistance, such as an in-dash navigation system. High-definition (HD) maps include enough detail to enable a vehicle system to autonomously, or partially autonomously, navigate on a motorway. Such detail generally involves either geographically smaller tiles or larger tile data sizes than LD maps, putting a strain on delivery networks. Further, the greater number of high-resolution details have a greater likelihood of changing over time. This causes HD map tile maintenance to be more involved than LD map tile maintenance.

Crowdsourcing HD map tiles may alleviate one or both of the issues noted above. Sensor platforms on autonomous vehicles process the environment as the vehicle moves along a motorway and provide updates to the map tiles. Further, these vehicles may share their findings with other vehicles and RSUs for edge distribution, in addition to providing updates to a cloud service. HD map tile crowdsourcing enables map tile refreshes to reflect real-time, or nearly real-time, updates on roads. Such up-to-date map tiles help autonomous and semi-autonomous vehicles improve awareness of the surrounding environment. However, current HD maps solutions cannot yet reflect all real-time road dynamics-quickly moving or transient features such as pedestrians, cyclists, etc.—and several limitations exist with respect to scalability and ubiquitous coverage.

Specifically, current HD maps solutions are often limited in several ways. For example, current systems often are unable to reflect moving objects in roads because such systems use a few sensors in a vehicle. Crowdsourcing is generally dependent on vehicle density (e.g., how many vehicles are within radio communication with each other or use the same HD maps application or crowdsource to the same dataset) to be useful. Current systems generally have a centralized approach to HD maps tile refreshes that is often out-of-date. This issue is more evident with regard to short-lived events such as moving objects, temporary stationary objects (e.g., a stopped school bus or fallen tree), etc., causing these events to be omitted from HD map tiles. Further, there is often no backup solution to provide minimal viable tiles in emergency cases (e.g., when the vehicle loses connection to the cellular network). Additionally, current systems tend to use network resources inefficiently. For example, tiles are downloaded in a systematic manner (e.g., download tiles for the next five miles) rather than exploiting wireless network connectivity when it is good.

To address the issues noted above, a system for enhanced electronic navigation maps is described herein. This system is multi-faceted and includes in-vehicle hardware to enable real-time sensor fusion and map tile fusion. This enables the vehicle to enhance received HD map tiles with moving object sensor data. This data may then be shared to other vehicles, which will use their hardware in turn to integrate the enhanced map tile with their own sensor readings. This identification of moving object may be shared with metadata that keeps it local, preventing stale data from being distributed to other users. Moreover, by integrating radio communications and RSU control, the vehicle may manage tile distribution to make more efficient use of available wireless network resources. Additionally, RSUs may be enhanced to include minimally viable map tile options to enable navigation in the case of a network failure, or other factor that prevents timely reception of map tiles in the vehicle. Additional details and examples are provided below.

FIG. 1 is a block diagram of an example of an environment including a vehicle 105, an RSU 110, and a cloud service 120, according to an embodiment. Also illustrated are a pedestrian 125 and a second vehicle 115 (e.g., moving or transient objects). In a traditional HD map tile delivery system, map tiles are wirelessly delivered to the vehicle from the cloud service 120. This form of delivery may be referred to a core delivery. In an example, these map tiles may also be delivered by the RSU 110 or the second vehicle 115. These forms of delivery may be called edge delivery. As noted above, traditional HD map tiles generally do not include information about moving objects.

As used herein, a moving object is one that occupies a single geographic location less than a threshold amount of time. Thus, the moving object may be stationary at some point, such as a car stopped at a light, but is considered a moving object if it is stopped for less than the threshold amount of time. This threshold is set based on a communication latency between sensing the object and relaying that object to an entity for use, such as the vehicle 105. The reason for this is the usefulness of stale data and the processing cost to sense, store, and communicate data that may become stale.

The vehicle 105 includes processing circuitry to implement the map enhancing techniques described herein. In an example, the processing circuitry is a field programmable gate array (FPGA). Modern FPGAs enable near application specific integrated circuit (ASIC) (e.g., dedicated hardware) processing speeds while also accommodating varying workloads. This combination enables both sensor fusion at the vehicle 105 to facilitate real-time perception of moving objects, as well as a more varied map tile delivery technique in which data is integrated with cloud service 120 deliveries of map tiles as needed. In this context, a vehicle component (e.g., processing circuitry of a navigation system) of the vehicle 105 is configured to receive a set of map tiles from a remote entity (e.g., the cloud service 120). In an example, the remote entity is the RSU 110. In an example, the remote entity is the second vehicle 115.

Figure 4:
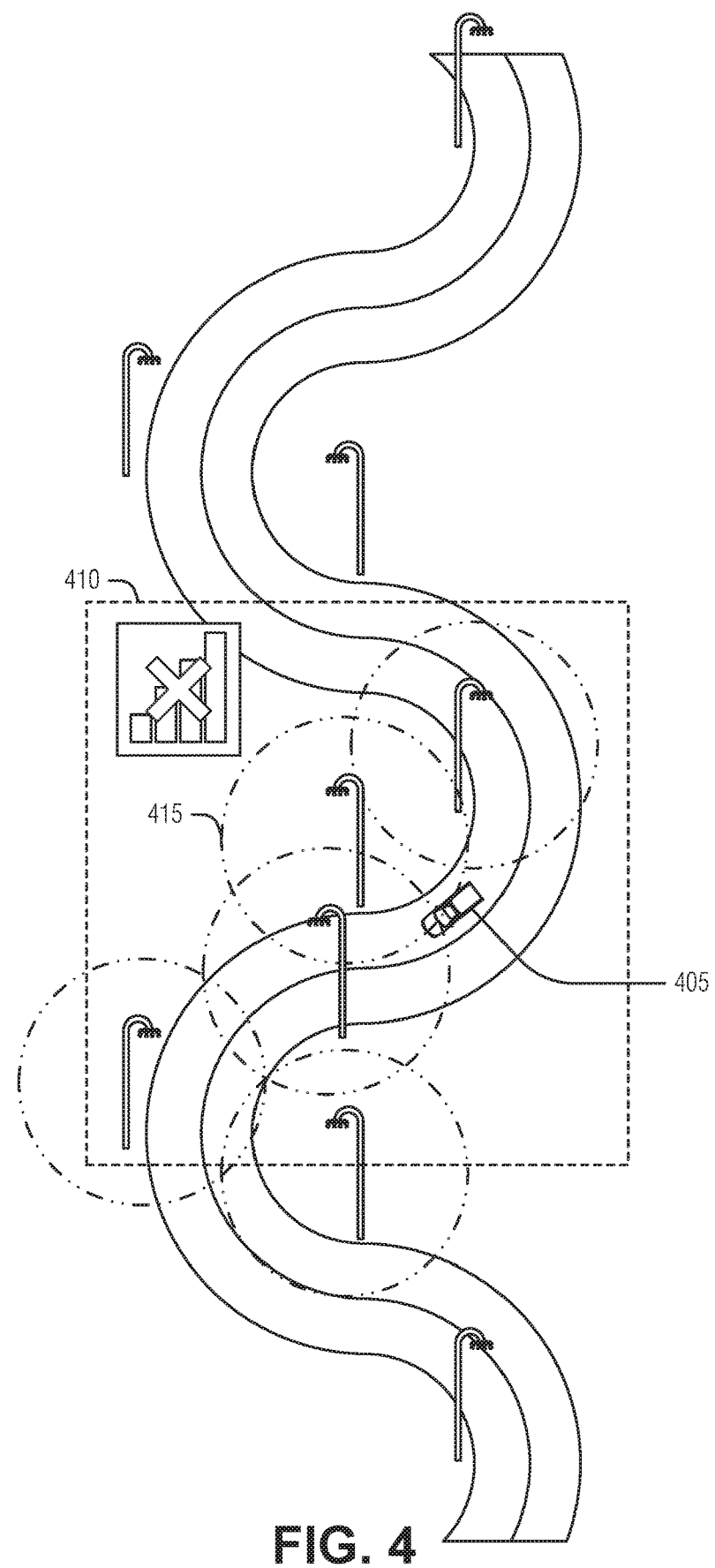
FIG. 4 illustrates an example of a system to provide minimum viable tiles, according to an embodiment.

In an example, the RSU provides a minimum viable tile as part of the set of map tiles. Here, instead of a standard HD map tile, a reduced set of data is provided in order to fill a coverage gap. The coverage gap may occur due to an outage (e.g., eNB failure), or due to a lack of wireless coverage, as may happen in rural or underpopulated areas. The minimum viable HD map tile includes essential data to keep an autonomous vehicle on the road. Thus, for example, there may be different levels of minimum viable map tile based on the type of autonomous vehicle. Data included in the minimum viable map tile will often include road edge definitions. FIG. 4 illustrates an example of RSUs providing minimum viable map tiles in a low-coverage area.

In an example, the vehicle component is configured to measure connectivity with the remote entity. This measurement is then used to request a number (or total size) of map tiles during a refresh. Using this technique, the vehicle 105 adjusts its request to efficiently use the available wireless resources. For example, a planned path for the vehicle 105 may involve a drive through a first city on its way to several miles in the country. The planned path is generally known to the vehicle component as part of the user navigation input required to inform the vehicle of its destination. While wireless connectivity is high, the vehicle component aggressively requests map tiles (e.g., up to its maximum storage capacity) in anticipation of poor coverage later (e.g., in the rural segment of the planned path).

Figure 5:
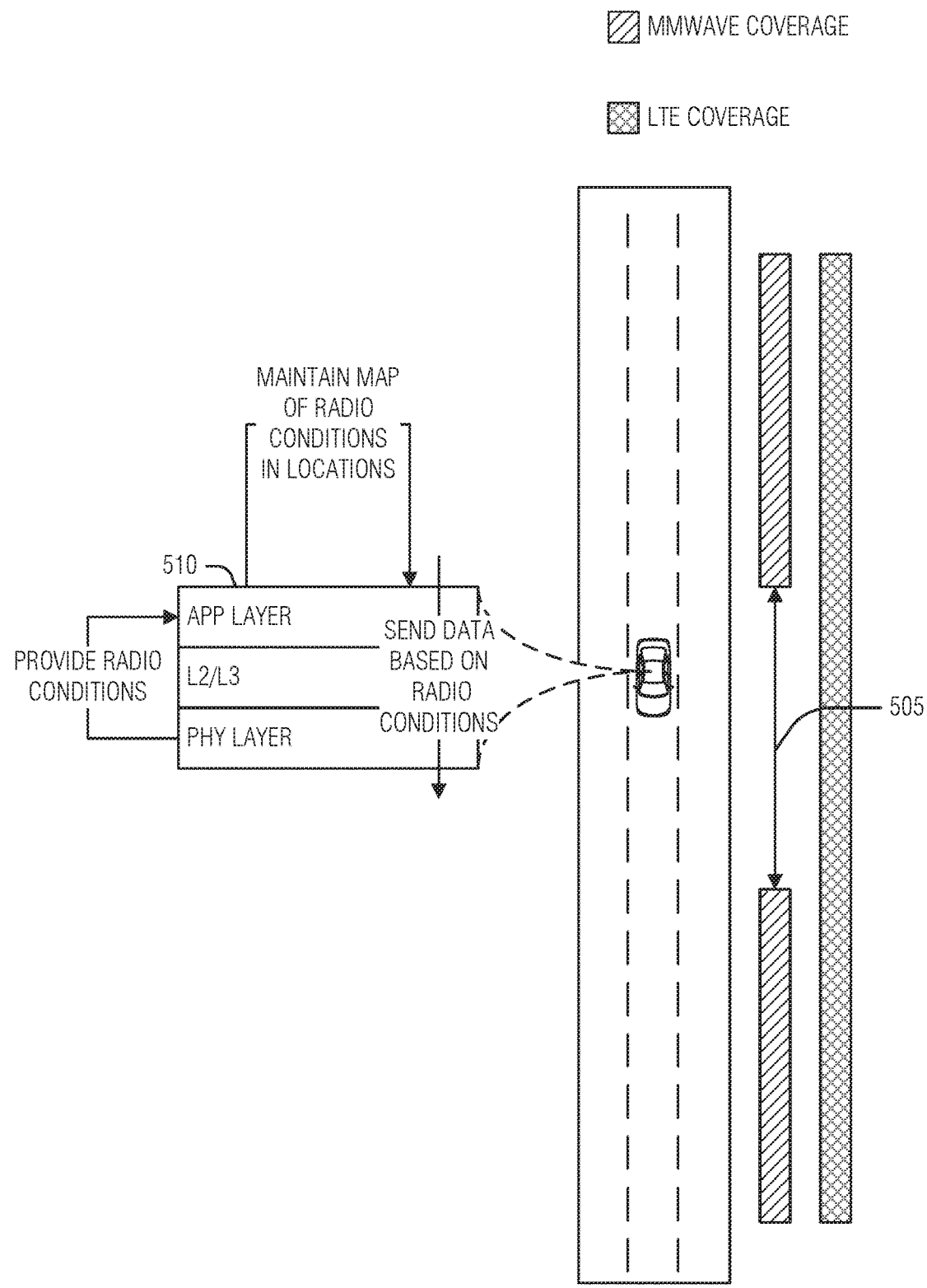
FIG. 5 illustrates an example of a system for connection quality based map tile requests, according to an embodiment.

In an example, the planned path of the vehicle is communicated to the remote entity (e.g., the RSU 110 or the cloud service 120). Additionally, a request to cache map tiles at additional RSUs along the planned path is made to the remote entity. In an example, this communication is made in response to a determination that segments of the planned path do not have wireless links for the vehicle to download additional map tiles. The wireless links referred to here are those the vehicle 105 is capable of making without assistance from the RSUs. Thus, "wireless links" in this context excludes wireless communications with those RSUs. These examples enable the vehicle's knowledge of its own path to implement a smart RSU caching of map tiles. Not only may this provide map tile coverage for the vehicle 105, but it may also be used to reduce long-range wireless use, resulting in more efficient networks. FIG. 5 illustrates an example of measuring radio connectivity and reacting accordingly.

The vehicle component is configured to obtain (e.g., receive or retrieve) sensor derived data that has a locality corresponding to a map tile in the set of map tiles. Sensor derived data refers to data directly from sensors in the vehicle 105, from sensors in another vehicle (e.g., the second vehicle 115), from sensor in the RSU 110, or from processed sensor data-such as information produced by a classifier (e.g., artificial neural network (ANN)) or an aggregator operating on sensor data. Thus, in an example, a part of the sensor derived data is received from the RSU 110 as crowdsourced sensor data from other vehicles (e.g., the second vehicle 115).

In an example, at least a part of the sensor derived data includes identification of a moving object in an environment observed by the sensors. Part of identifying a moving object is classification of the object to distinguish it from other, more permanent fixtures of the environment. Such classification may make use of advanced machine learning techniques-such as deep neural network (DNN), clustering techniques, etc.—or may use simple difference techniques. In an example, the identification of the moving object includes a longevity. The longevity is an estimate of the moving objects duration and may be a product of the classification. For example, the velocity of the pedestrian 125 may be produced as an output of the classification. Given the pedestrian's position and the velocity, the vehicle 105 may estimate the time before the pedestrian 125 leaves the road. Longevity may also be determined based on the type of moving object. For example, if the moving object is a stopped school bus, the longevity may be the average time a school bus stops. In any case, the longevity provides insight into the transience of the moving object.

Figure 3:
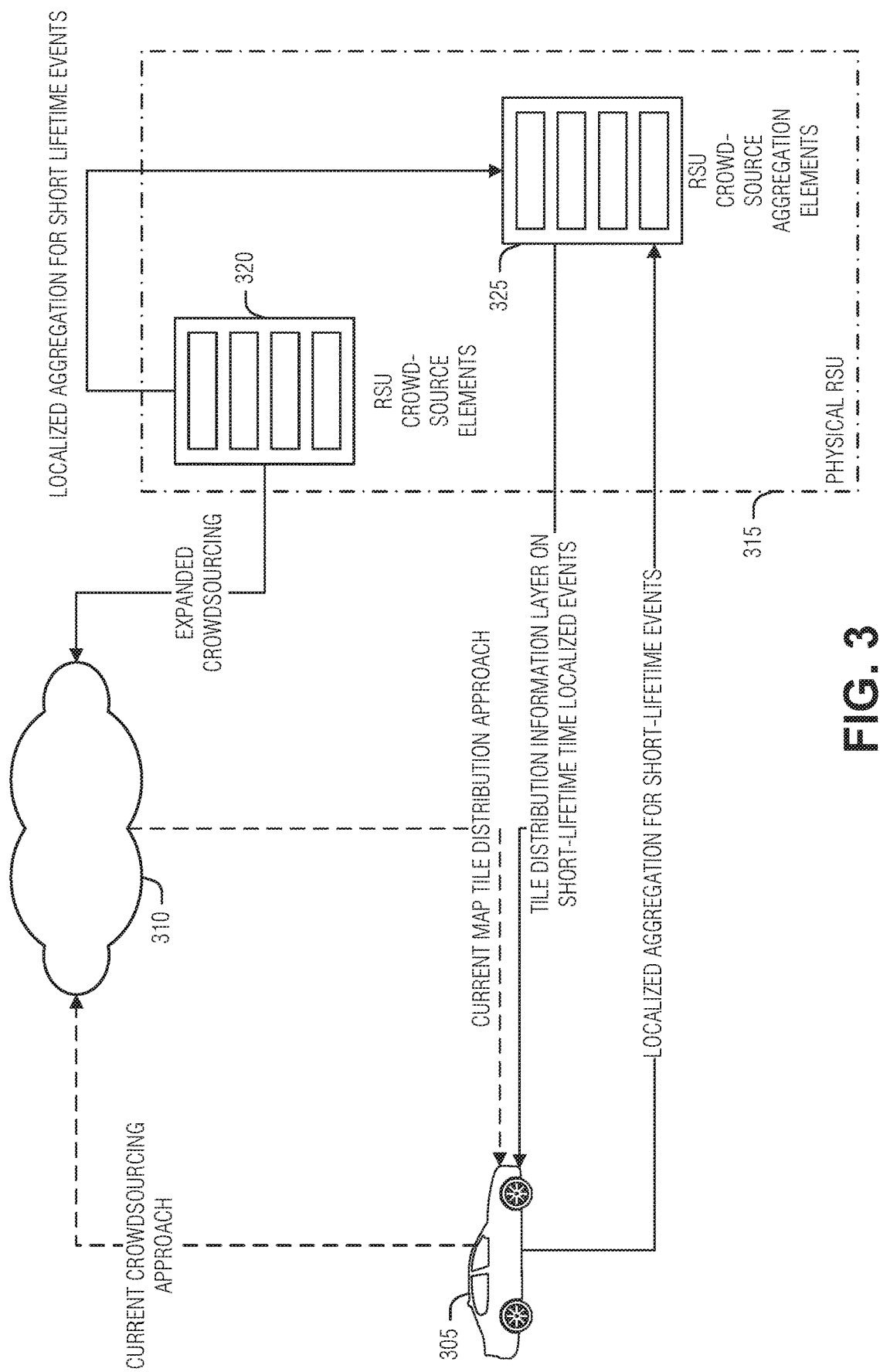
FIG. 3 illustrates an example of a system for RSU supported local transient events, according to an embodiment.

In an example, the identification of the moving object is communicated by the vehicle 105 to the RSU 110 for distribution to other vehicles (e.g., the second vehicle 115). In an example, a longevity value of the identification of the moving object prevents the RSU 110 from communicating the identification of the moving object to a higher network level (e.g., to the cloud service 120). Thus, the RSU 110 is configured to provide a local, transient object map tile to vehicles that does not pollute the repository of the cloud service 120 or other static layers with data that will soon be out-of-date. This technique also reduced network backhaul requirements for this local data. FIG. 3 illustrates an example of RSU enables data aggregation and localized transient events.

In an example, the sensor derived data includes data from multiple sensors of the vehicle 105. Here, the vehicle component is operating to fuse the sensor data. Using an FPGA may be necessarily to get the performance required for combining, for example, camera data with LIDAR to identify and classify the pedestrian, or other moving object. In an example, a first piece of data from a first sensor and a second piece of data from a second sensor are collected at different times. This example reflects a real possibility that sensors have different duty cycles, or different operating parameters such that the sensor fusion involves aligning (e.g., registering) the data from the multiple sensors as part of combining that sensor data. In an example, the FPGA is configured for sensor fusion. Here, the configured FPGA is invoked on the data from the multiple sensors of the vehicle to create at least a part of the sensor derived data. As noted above, the flexibility of an FPGA enables it to be re-tasked for sensor fusion, and the speed of the FPGA enables real-time observation or classification of moving objects.

Figure 2:
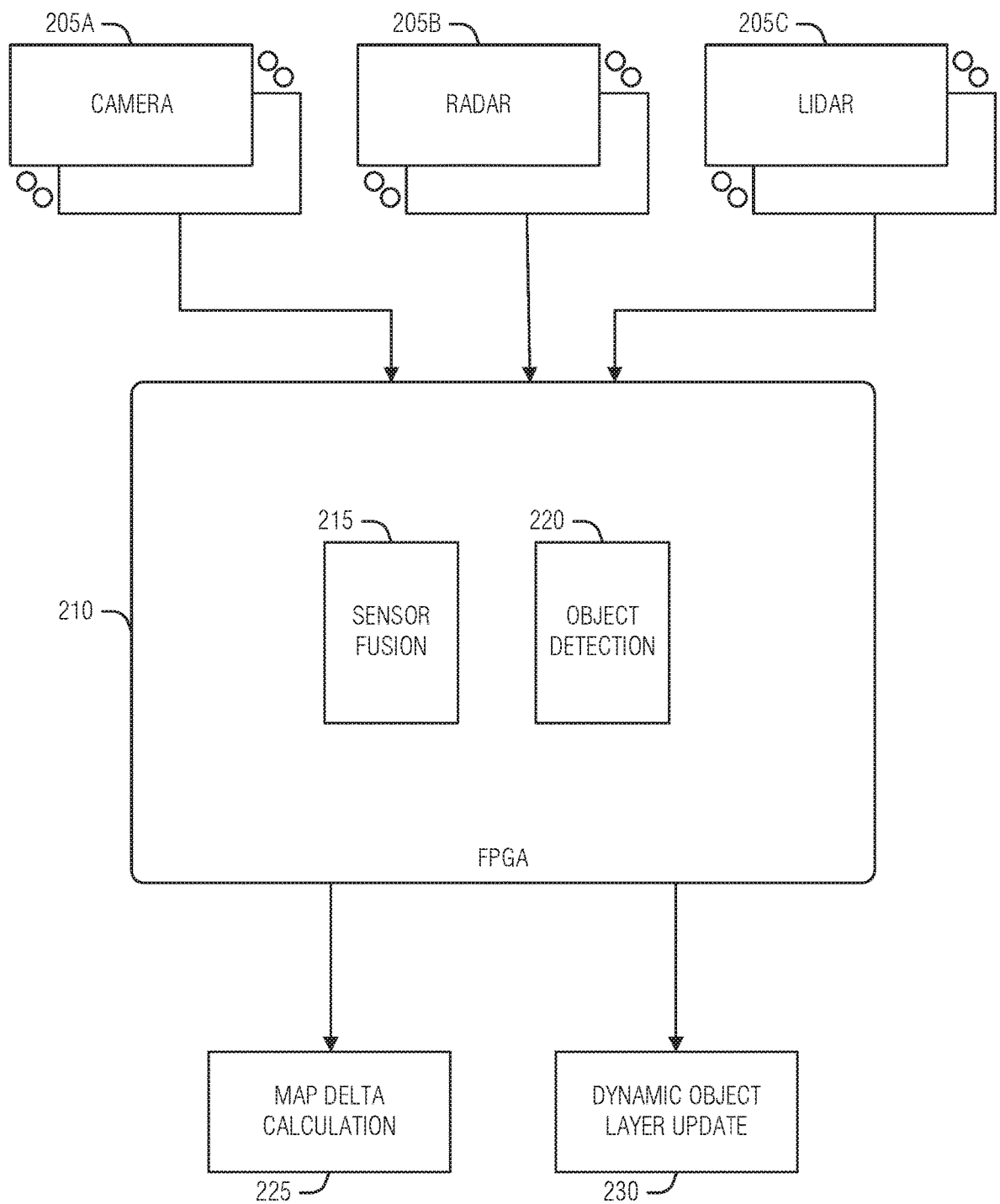
FIG. 2 illustrates a block diagram of an example of a system for sensor fusion in a vehicle, according to an embodiment.

An FPGA of the vehicle 105 is invoked to combine the sensor derived data and the map tile and create a modified map tile. Here, the sensor data is fused with the map tile. Due to the complexity of information that may be combined in this process, an FPGA will generally provide the best results to enable real-time use of this information in vehicle control for autonomous navigation, however other processing circuitry of the vehicle 105 may be used. In an example, a minimum viable tile is used as the map tile when a connection to a second entity that has a more complete map tile, is unavailable. FIG. 2 illustrates an example of using the FPGA for both sensor fusion as well as sensor and map tile fusion.

Once the modified map tile is produced, it may be used for vehicle localization, planning, navigation, or control. Thus, the vehicle component is configured to communicate the modified map tile to a control system of the vehicle 105. Using the techniques described herein, a greater level of situational awareness is delivered to autonomous vehicle navigation systems, even in the face of network failures.

FIG. 2 illustrates a block diagram of an example of a system for sensor fusion in a vehicle, according to an embodiment. As illustrated, the system includes multiple sensors 205, such as cameras 205A, RADARs 205B, and LIDAR 205C, among others. The sensors 205 are communicatively coupled to an FPGA 210 when in operation. The FPGA 210 may include components (e.g., a configuration) for sensor fusion 215 or object detection 220 (e.g., object classification). These components enable the FPGA wq0 to process the sensor data and map tiles to produce a map delta calculation 225 or a dynamic object layer update 230. The map delta calculation 225 provide modifications to a received map tile for navigation purposes that may be shared with a map tile provider as a crowdsourced update. The dynamic object (e.g., transient or moving object) layer update 230 provides information (e.g., identification) about moving objects observed by the sensors 205. This may be shared within a local RSU coverage area as described above with respect to FIG. 1.

Thus, the illustrated system provides the capability to detect and to reflect moving objects in roads via HD map tiles or layers (e.g., overlays). While current HD maps solutions cannot reflect dynamic objects (e.g., cyclist moving in a cyclist lane, animal crossing, pedestrian moving, runners, etc.)—because they lack sensing capabilities with real-time detection and recognition of moving objects and the traditional crowdsourcing to the cloud suppress the real-time part of the moving objects—this system may be deployed in a vehicle for real-time moving object detection fusion of the crowdsourced data to overcome the limitations of current systems. Here, it is better to leverage multiple sensors and perform sensor fusion to reflect movement of objects in multiple time instances, which helps also to detect the type of object.

This system may also be used to address limited sensors in any given vehicle. Current HD map crowdsourcing mainly focuses on disjoint camera 205A and LIDAR 205C input. This creates the need for software based synchronization to coordinate (e.g., synchronize) the different inputs, raising the risk of single point of failure. Instead, the illustrated system-implemented in an autonomous driving platform, a telematics unit, or an in-vehicle-infotainment (IVI)—integrates multiple sensors 205 (e.g., temperature sensor, audio sensor sensing noise from roads "e.g., ambulance", etc.) to extract moving objects in a fast and reliable manner. The system also provides reconfigurable sensor fusion to fuse these inputs and crowdsourced object data for HD maps. In an example, a second level of fusion may be used to combine various source objects to avoid tighter synchronization requirements (e.g., eliminating software synchronization). Additionally, the FPGA 210 may be reconfigured to fuse the data based on available input streams and continue to provide fusion support even in the absence of an information source used to identify objects. Further, the illustrated multiple sensor and fusion pipeline output for the crowdsourced data from the vehicle enables better outlier rejection, such as omitting un-meaningful information that may come from sensors 205, or normalizing the crowdsourced outcome based on weights from each sensor 205.

FIG. 3 illustrates an example of a system for RSU supported local temporal events, according to an embodiment. The vehicle 305 is connected to the cloud service 310 to acquire some map tiles or map tile information in a traditional manner. Additionally, the vehicle 305 is connected to a physical RSU 315 for localized map tile data. The physical RSU 315 may include processing elements for map tile refreshes 320 or aggregated local data 325 that is not shared with the cloud service 310. This aggregated local data 325 may include such this as traffic flow, hazards, or other transient object information that is provided to the vehicle 305 as a map tile layer, or a modified map tile.

The illustrated system enables a richer and more meaningful HD maps tiles with up to date information than is available via the traditional HD map tile system. When using crowdsourcing, if roads are not dense with vehicles supporting the HD maps crowdsourcing, then traditional HD map tile crowdsourcing will be limited. To overcome this limitation, the RSU 315 provides several benefits over traditional systems. For example, the RSU 315 expands crowdsourcing to the RSU 315, using cameras or other sensors. Further, sensing and compute elements in the RSU 315 are leveraged to provide inputs to crowdsourcing. Having an always-on permanent crowdsourcing element serving the vehicle 305 even during low vehicle density and providing redundant crowdsourcing information or additional angles with high vehicle density, is currently missing from available HD map tile systems.

The RSU 315 also provides a local centralized approach to deliver up-to-date refresh of maps tiles. Current HD maps tile freshness often does not accurately reflect events with a short lifetime (e.g., moving objects, temporary stationary objects such as a stopped school bus). However, the illustrated system enables expanded ingestion and aggregation of crowdsourced data at the RSU 315. Localized ingestion and aggregation of the crowdsourced data relative to short lifetime events may help guarantee that, when a short lifetime event (e.g., stop of a school bus) starts and when a short lifetime event ends (e.g., stopped school bus starts to move), this information flows to the vehicle 305, or other interested entities, without being sent to the cloud service 310. In this capacity, the RSU 315 may provide additional tile layers to HD map tiles distributed only in the local road segment for short lifetime events. Metadata, indicating a short lifetime event, may be provided instead of a structural change to the map tile. In an example, several levels of lifetime duration (e.g., longevity) may be used to classify these events. These levels may include: fast moving vehicles (level 1); bicycles (level 2); pedestrian (level 3); location gathering, localized mobility (e.g., construction zone) (level 4); currently stationary (e.g., orange cone) (level 5); structural changes (e.g., new buildings) (level 6); or new road (level 7).

FIG. 4 illustrates an example of a system to provide minimum viable tiles, according to an embodiment. As illustrated, the vehicle 405 is on a roadway in a cellular dead zone 410 (e.g., there is no cellular wireless coverage in the dead zone 410). The vehicle 405 is, however, within the coverage area 415 for an RSU. In an example, this arrangement may be used for a minimal viable tiles provision when connectivity is lost. Although HD map tiles are valuable, the vehicle 105 may be in a situation that does not allow tiles to be downloaded, and the vehicle 405 may run out of tiles. This may happen if the vehicle 205 loses connection to the cellular network (e.g., rural area, uncovered area, under a long tunnel, etc.). To address this issue, the RSUs may store minimum viable map tiles and deliver them to the vehicle 205 if the vehicle loses connectivity. The minimum viable map tiles provide the smallest amount of information to enable the vehicle 405 to drive safely. In an example, the RSUs include beacon radios-such as Bluetooth radios, or those which are already installed for e-payment for parking, EV charging, sensing vehicles density on roads for traffic management services, or other similar services—to indicate the availability of minimum viable map tiles. In an example, the creation of location maps at the road side units using location by reference using the beacon radios provides an automatic facility to beaconing to localize objects, and distribute an up-to-date location of these objects to all vehicles passing in the road segment.

FIG. 5 illustrates an example of a system for connection quality based map tile requests, according to an embodiment. As illustrated, the vehicle includes a radio aware control stack 510 to make map tile requests based on coverage gaps 505 in a part of a heterogenous radio network. This solves a current problem of non-efficient use of the network resources. Traditionally, HD map tiles are downloaded a systematic manner without benefiting from the best connectivity when it exists. That is, the current approach starts to request new tiles when the vehicle stock of tiles approaches its end. This introduces a risk of running out of tiles or delaying tile downloads if the vehicle starts requesting tiles in a spot suffering from network bottlenecks 505. To address this issue, the stack 510 avoids the systematic reactive approach in map tile requests to a proactive approach with connectivity quality awareness where the best connectivity is leveraged. For example, the radio layer (e.g., physical or PHY layer) provides information related to the radio conditions to the application layer (e.g., L2 or L3) to schedule data transmission for times when the connectivity enables better throughput. This may leverage 5G millimeter wave (mmWave) capabilities to populate RSUs to proactively request tiles when the vehicle is within range of the RSUs. For example, mmWave hotspots may be deployed in the roads with 5G, and may be used opportunistically. Once the application learns about the radio conditions in the road (and assuming the base stations remain in place), the application may delay the transmission of information that is not urgent by a few seconds or minutes before transmitting. Immediately needed information, such as "pedestrian crossing," may be transmitted immediately using whatever radio access is available. Information such as a new building or a new road, may be delayed and be transmitted when a hotspot/booster cell is available.

In an example, the decision of when to send the data based on radio conditions may include various considerations. For example, how urgent is the information update, the level of crowdsourcing needed by the network side of the application to make the update positive or negative (e.g., true or false), the level of the event longevity—e.g., fast moving vehicles (level 1), bicycles (level 2), pedestrian (level 3), location gathering, localized mobility (e.g., construction zone) (level 4), currently stationary (e.g., orange cone) (level 5), structural changes (e.g., new buildings) (level 6), new road (level 7), etc.).

Figure 6:
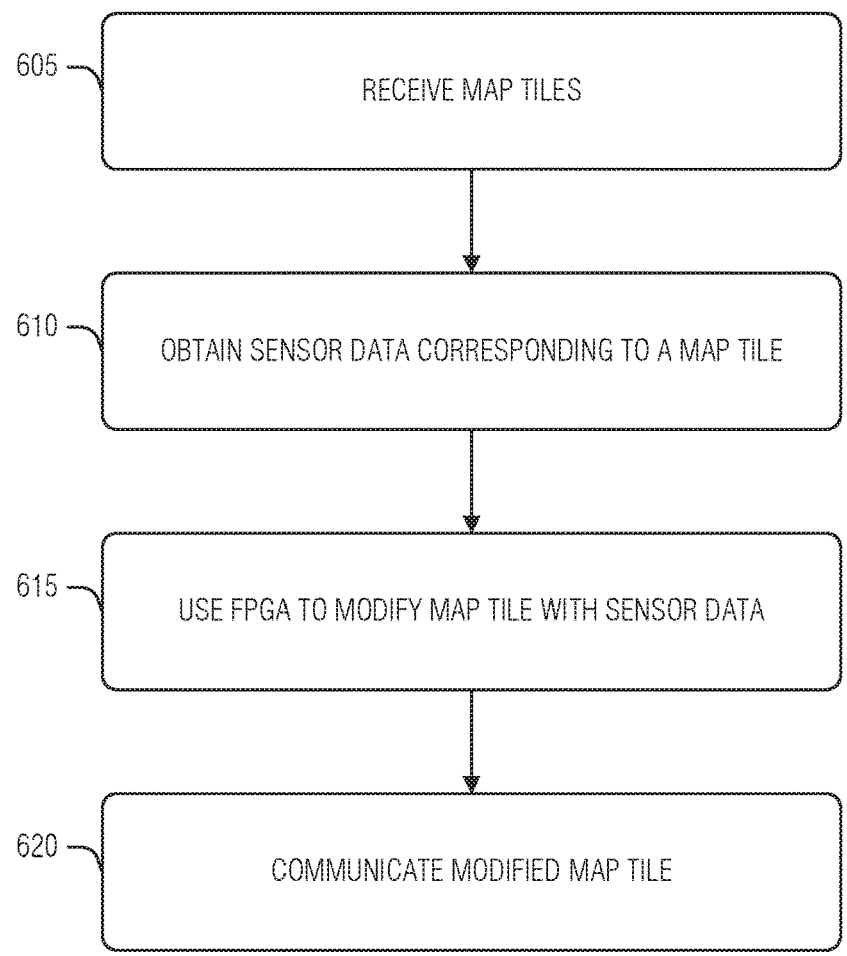
FIG. 6 illustrates a flow diagram of an example of a method for multi-factor intelligent agent control, according to an embodiment.

FIG. 6 illustrates a flow diagram of an example of a method 600 for multi-factor intelligent agent control, according to an embodiment. The operations of the method 600 are implemented in computer hardware, such as that described above or below (e.g., processing circuitry).

At operation 605, a vehicle component receives a set of map tiles from a remote entity. In an example, the remote entity is an RSU. In an example, the RSU provides a minimum viable tile as part of the set of map tiles.

In an example, receiving the set of map tiles involves measuring connectivity with the remote entity and requesting a number of map tiles for the set of map tiles based on the measured connectivity. In an example, a planned path of the vehicle is communicated to an RSU. A request for the RSU to cache map tiles at additional RSUs along the path is then be made. In an example, this communication with RSU is made in response to a determination that segments of the planned path do not have wireless links for the vehicle to download additional map tiles.

At operation 610, sensor derived data that has a locality corresponding to a map tile in the set of map tiles is obtained. In an example, a part of the sensor derived data is received from an RSU as crowdsourced sensor data from other vehicles.

In an example, the sensor derived data includes data from multiple sensors of the vehicle. In an example, a first piece of data from a first sensor and a second piece of data from a second sensor are collected at different times. In an example, the FPGA is configured for sensor fusion. Here, the configured FPGA is invoked on the data from the multiple sensors of the vehicle to create at least a part of the sensor derived data.

In an example, at least a part of the sensor derived data includes identification of a moving object in an environment observed by the sensors. In an example, the identification of the moving object includes a longevity. In an example, the identification of the moving object is communicated by the vehicle to an RSU for distribution to other vehicles. In an example, a longevity value of the identification of the moving object prevents the RSU from communication the identification of the moving object to a higher network level.

At operation 615, an FPGA of the vehicle is invoked to combine the sensor derived data and the map tile and create a modified map tile. In an example, a minimum viable tile is used as the map tile when a connection to a second entity that has a more complete map tile, is unavailable.

At operation 620, the modified map tile is communicated to a control system of the vehicle.

Figure 7:
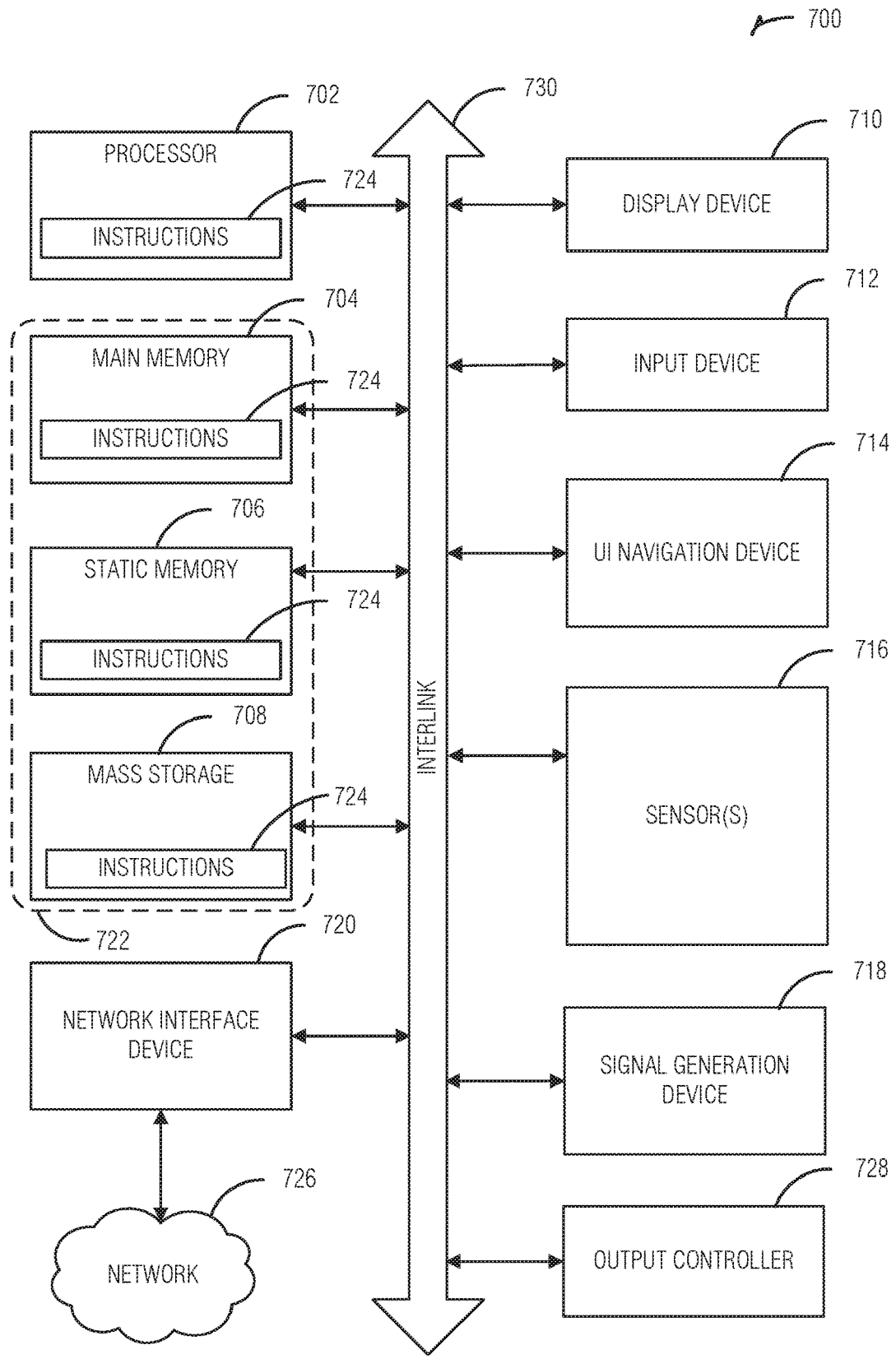
FIG. 7 is a block diagram illustrating an example of a machine upon which one or more embodiments may be implemented.

FIG. 7 illustrates a block diagram of an example machine 700 upon which any one or more of the techniques (e.g., methodologies) discussed herein may perform. Examples, as described herein, may include, or may operate by, logic or a number of components, or mechanisms in the machine 700. Circuitry (e.g., processing circuitry) is a collection of circuits implemented in tangible entities of the machine 700 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 700 follow.

In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 700 may include a hardware processor 702 (e.g., a central processing unit (CPU), a graphics processing unit (GPU), a hardware processor core, or any combination thereof), a main memory 704, a static memory (e.g., memory or storage for firmware, microcode, a basic-input-output (BIOS), unified extensible firmware interface (UEFI), etc.) 706, and mass storage 708 (e.g., hard drive, tape drive, flash storage, or other block devices) some or all of which may communicate with each other via an interlink (e.g., bus) 730. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 708, a signal generation device 718 (e.g., a speaker), a network interface device 720, and one or more sensors 716, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 702, the main memory 704, the static memory 706, or the mass storage 708 may be, or include, a machine readable medium 722 on which is stored one or more sets of data structures or instructions 724 (e.g., software) embodying or utilized by any one or more of the techniques or functions described herein. The instructions 724 may also reside, completely or at least partially, within any of registers of the processor 702, the main memory 704, the static memory 706, or the mass storage 708 during execution thereof by the machine 700. In an example, one or any combination of the hardware processor 702, the main memory 704, the static memory 706, or the mass storage 708 may constitute the machine readable media 722. While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 722 may be representative of the instructions 724, such as instructions 724 themselves or a format from which the instructions 724 may be derived. This format from which the instructions 724 may be derived may include source code, encoded instructions (e.g., in compressed or encrypted form), packaged instructions (e.g., split into multiple packages), or the like. The information representative of the instructions 724 in the machine readable medium 722 may be processed by processing circuitry into the instructions to implement any of the operations discussed herein. For example, deriving the instructions 724 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 724.

In an example, the derivation of the instructions 724 may include assembly, compilation, or interpretation of the information (e.g., by the processing circuitry) to create the instructions 724 from some intermediate or preprocessed format provided by the machine readable medium 722. The information, when provided in multiple parts, may be combined, unpacked, and modified to create the instructions 724. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 724 may be further transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software. A transmission medium is a machine readable medium.

ADDITIONAL NOTES & EXAMPLES

Example 1 is a device for enhanced electronic navigation maps for a vehicle, the device comprising: a memory including instructions: and processing circuitry that, when in operation, is configured by the instructions to: receive, by a vehicle component, a set of map tiles from a remote entity: obtain sensor derived data that has a locality corresponding to a map tile in the set of map tiles; invoke a field-programmable gate array (FPGA) of the vehicle to combine the sensor derived data and the map tile and create a modified map tile: and communicate the modified map tile to a control system of the vehicle.

In Example 2, the subject matter of Example 1, wherein the sensor derived data includes data from multiple sensors of the vehicle.

In Example 3, the subject matter of Example 2, wherein a first piece of data from a first sensor and a second piece of data from a second sensor are collected at different times.

In Example 4, the subject matter of any of Examples 2-3, wherein the instructions configure the processing circuitry to: configure the FPGA for sensor fusion; and invoke the FPGA on the data from the multiple sensors of the vehicle to create at least a part of the sensor derived data.

In Example 5, the subject matter of Example 4, wherein the at least a part of the sensor derived data includes identification of a moving object in an environment observed by the sensors to produce the sensor data.

In Example 6, the subject matter of Example 5, wherein the identification of the moving object includes a longevity.

In Example 7, the subject matter of any of Examples 5-6, wherein the identification of the moving object is communicated by the vehicle to a road side unit (RSU) for distribution to other vehicles.

In Example 8, the subject matter of Example 7, wherein a part of the sensor derived data is received from the RSU as crowdsourced sensor data from other vehicles.

In Example 9, the subject matter of any of Examples 7-8, wherein a longevity value of the identification of the moving object prevents the RSU from communicating the identification of the moving object to a higher network level.

In Example 10, the subject matter of any of Examples 1-9, wherein the remote entity is a road side unit (RSU), and wherein receiving the set of map tiles from the remote entity includes receiving a minimum viable tile from RSU.

In Example 11, the subject matter of Example 10, wherein the minimum viable tile is used as the map tile when a connection to a second entity that has a more complete map tile, is unavailable.

In Example 12, the subject matter of any of Examples 1-11, wherein, to receive the set of map tiles from the remote entity, the instructions configure the processing circuitry to: measure connectivity with the remote entity; and request a number of map tiles for the set of map tiles based on the measured connectivity.

In Example 13, the subject matter of Example 12, wherein the instructions configure the processing circuitry to communicate: a planned path of the vehicle to a road side unit (RSU); and a request to cache map tiles at additional RSUs along the path.

In Example 14, the subject matter of Example 13, wherein performance of the communication is in response to a determination that segments of the planned path do not have wireless connectivity for the vehicle to download additional map tiles.

Example 15 is a method for enhanced electronic navigation maps for a vehicle, the method comprising: receiving, by a vehicle component, a set of map tiles from a remote entity; obtaining sensor derived data that has a locality corresponding to a map tile in the set of map tiles: invoking a field-programmable gate array (FPGA) of the vehicle to combine the sensor derived data and the map tile and create a modified map tile; and communicating the modified map tile to a control system of the vehicle.

In Example 16, the subject matter of Example 15, wherein the sensor derived data includes data from multiple sensors of the vehicle.

In Example 17, the subject matter of Example 16, wherein a first piece of data from a first sensor and a second piece of data from a second sensor are collected at different times.

In Example 18, the subject matter of any of Examples 16-17, comprising: configuring the FPGA for sensor fusion:

and invoking the FPGA on the data from the multiple sensors of the vehicle to create at least a part of the sensor derived data.

In Example 19, the subject matter of Example 18, wherein the at least a part of the sensor derived data includes identification of a moving object in an environment observed by the sensors to produce the sensor data.

In Example 20, the subject matter of Example 19, wherein the identification of the moving object includes a longevity.

In Example 21, the subject matter of any of Examples 19-20, wherein the identification of the moving object is communicated by the vehicle to a road side unit (RSU) for distribution to other vehicles.

In Example 22, the subject matter of Example 21, wherein a part of the sensor derived data is received from the RSU as crowdsourced sensor data from other vehicles.

In Example 23, the subject matter of any of Examples 21-22, wherein a longevity value of the identification of the moving object prevents the RSU from communicating the identification of the moving object to a higher network level.

In Example 24, the subject matter of any of Examples 15-23, wherein the remote entity is a road side unit (RSU), and wherein receiving the set of map tiles from the remote entity includes receiving a minimum viable tile from RSU.

In Example 25, the subject matter of Example 24, wherein the minimum viable tile is used as the map tile when a connection to a second entity that has a more complete map tile, is unavailable.

In Example 26, the subject matter of any of Examples 15-25, wherein receiving the set of map tiles from the remote entity includes: measuring connectivity with the remote entity; and requesting a number of map tiles for the set of map tiles based on the measured connectivity.

In Example 27, the subject matter of Example 26, comprising communicating: a planned path of the vehicle to a road side unit (RSU); and a request to cache map tiles at additional RSUs along the path.

In Example 28, the subject matter of Example 27, wherein the communicating is in response to a determination that segments of the planned path do not have wireless connectivity for the vehicle to download additional map tiles.

Example 29 is at least one machine readable medium comprising information respective of instructions for enhanced electronic navigation maps for a vehicle, the instructions, when executed by processing circuitry, cause the processing circuitry to perform operations comprising: receiving, by a vehicle component, a set of map tiles from a remote entity: obtaining sensor derived data that has a locality corresponding to a map tile in the set of map tiles; invoking a field-programmable gate array (FPGA) of the vehicle to combine the sensor derived data and the map tile and create a modified map tile: and communicating the modified map tile to a control system of the vehicle.

In Example 30, the subject matter of Example 29, wherein the sensor derived data includes data from multiple sensors of the vehicle.

In Example 31, the subject matter of Example 30, wherein a first piece of data from a first sensor and a second piece of data from a second sensor are collected at different times.

In Example 32, the subject matter of any of Examples 30-31, wherein the operations comprise: configuring the FPGA for sensor fusion: and invoking the FPGA on the data from the multiple sensors of the vehicle to create at least a part of the sensor derived data.

In Example 33, the subject matter of Example 32, wherein the at least a part of the sensor derived data includes identification of a moving object in an environment observed by the sensors to produce the sensor data.

In Example 34, the subject matter of Example 33, wherein the identification of the moving object includes a longevity.

In Example 35, the subject matter of any of Examples 33-34, wherein the identification of the moving object is communicated by the vehicle to a road side unit (RSU) for distribution to other vehicles.

In Example 36, the subject matter of Example 35, wherein a part of the sensor derived data is received from the RSU as crowdsourced sensor data from other vehicles.

In Example 37, the subject matter of any of Examples 35-36, wherein a longevity value of the identification of the moving object prevents the RSU from communicating the identification of the moving object to a higher network level.

In Example 38, the subject matter of any of Examples 29-37, wherein the remote entity is a road side unit (RSU), and wherein receiving the set of map tiles from the remote entity includes receiving a minimum viable tile from RSU.

In Example 39, the subject matter of Example 38, wherein the minimum viable tile is used as the map tile when a connection to a second entity that has a more complete map tile, is unavailable.

In Example 40, the subject matter of any of Examples 29-39, wherein receiving the set of map tiles from the remote entity includes: measuring connectivity with the remote entity: and requesting a number of map tiles for the set of map tiles based on the measured connectivity.

In Example 41, the subject matter of Example 40, wherein the operations comprise communicating: a planned path of the vehicle to a road side unit (RSU); and a request to cache map tiles at additional RSUs along the path.

In Example 42, the subject matter of Example 41, wherein the communicating is in response to a determination that segments of the planned path do not have wireless connectivity for the vehicle to download additional map tiles.

Example 43 is a system for enhanced electronic navigation maps for a vehicle, the system comprising: means for receiving, by a vehicle component, a set of map tiles from a remote entity; means for obtaining sensor derived data that has a locality corresponding to a map tile in the set of map tiles; means for invoking a field-programmable gate array (FPGA) of the vehicle to combine the sensor derived data and the map tile and create a modified map tile; and means for communicating the modified map tile to a control system of the vehicle.

In Example 44, the subject matter of Example 43, wherein the sensor derived data includes data from multiple sensors of the vehicle.

In Example 45, the subject matter of Example 44, wherein a first piece of data from a first sensor and a second piece of data from a second sensor are collected at different times.

In Example 46, the subject matter of any of Examples 44-45, comprising: means for configuring the FPGA for sensor fusion: and means for invoking the FPGA on the data from the multiple sensors of the vehicle to create at least a part of the sensor derived data.

In Example 47, the subject matter of Example 46, wherein the at least a part of the sensor derived data includes identification of a moving object in an environment observed by the sensors to produce the sensor data.

In Example 48, the subject matter of Example 47, wherein the identification of the moving object includes a longevity.

In Example 49, the subject matter of any of Examples 47-48, wherein the identification of the moving object is communicated by the vehicle to a road side unit (RSU) for distribution to other vehicles.

In Example 50, the subject matter of Example 49, wherein a part of the sensor derived data is received from the RSU as crowdsourced sensor data from other vehicles.

In Example 51, the subject matter of any of Examples 49-50, wherein a longevity value of the identification of the moving object prevents the RSU from communicating the identification of the moving object to a higher network level.

In Example 52, the subject matter of any of Examples 43-51, wherein the remote entity is a road side unit (RSU), and wherein receiving the set of map tiles from the remote entity includes receiving a minimum viable tile from RSU.

In Example 53, the subject matter of Example 52, wherein the minimum viable tile is used as the map tile when a connection to a second entity that has a more complete map tile, is unavailable.

In Example 54, the subject matter of any of Examples 43-53, wherein the means for receiving the set of map tiles from the remote entity include: means for measuring connectivity with the remote entity: and means for requesting a number of map tiles for the set of map tiles based on the measured connectivity.

In Example 55, the subject matter of Example 54, comprising means for communicating: a planned path of the vehicle to a road side unit (RSU); and a request to cache map tiles at additional RSUs along the path.

In Example 56, the subject matter of Example 55, wherein the communicating is in response to a determination that segments of the planned path do not have wireless connectivity for the vehicle to download additional map tiles.

Example 57 is at least one machine-readable medium including instructions that, when executed by processing circuitry, cause the processing circuitry to perform operations to implement of any of Examples 1-56.

Example 58 is an apparatus comprising means to implement of any of Examples 1-56.

Example 59 is a system to implement of any of Examples 1-56.

Example 60 is a method to implement of any of Examples 1-56.

Example 61 is at least one machine-readable storage medium comprising information representative of instructions that, when executed by processing circuitry, cause the processing circuitry to perform the operations of any of Examples 1-56.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document, for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A device for enhanced electronic navigation maps for a vehicle, the device comprising:
    a memory including instructions; and
    processing circuitry that, when in operation, is configured by the instructions to:
        receive, by a vehicle component, a set of map tiles from a remote entity;
        obtain sensor derived data that has a locality corresponding to a map tile in the set of map tiles;
        invoke a field-programmable gate array (FPGA) of the vehicle to combine the sensor derived data and the map tile and create a modified map tile; and
        communicate the modified map tile to a control system of the vehicle.

2. The device of claim 1, wherein the sensor derived data includes data from multiple sensors of the vehicle.

3. The device of claim 2, wherein the instructions configure the processing circuitry to:
    configure the FPGA for sensor fusion; and
    invoke the FPGA on the data from the multiple sensors of the vehicle to create at least a part of the sensor derived data.

4. The device of claim 3, wherein the at least a part of the sensor derived data includes identification of a moving object in an environment observed by the sensors to produce the sensor data.

5. The device of claim 4, wherein the identification of the moving object includes a longevity.

6. The device of claim 4, wherein the identification of the moving object communicated by the vehicle to a road side unit (RSU) for distribution to other vehicles.

7. The device of claim 6, wherein a part of the sensor derived data is received from the RSU as crowdsourced sensor data from other vehicles.

8. The device of claim 6, wherein a longevity value of the identification of the moving object prevents the RSU from communicating the identification of the moving object to a higher network level.

9. A method for enhanced electronic navigation maps for a vehicle, the method comprising:
   receiving, by a vehicle component, a set of map tiles from a remote entity;
   obtaining, by the vehicle component, sensor derived data that has a locality corresponding to a map tile in the set of map tiles;
   invoking, by the vehicle component, a field-programmable gate array (FPGA) of the vehicle to combine the sensor derived data and the map tile and create a modified map tile; and
   communicating, by the vehicle component, the modified map tile, to a control system of the vehicle.

10. The method of claim 9, wherein the sensor derived data includes data from multiple sensors of the vehicle.

11. The method of claim 10, comprising:
    configuring the FPGA for sensor fusion; and
    invoking the FPGA on the data from the multiple sensors of the vehicle to create at least a part of the sensor derived data.

12. The method of claim 11, wherein the at least a part of the sensor derived data includes identification of a moving object in an environment observed by the sensors to produce the sensor data.

13. The method of claim 12, wherein the identification of the moving object includes a longevity.

14. The method of claim 12, wherein the identification of the moving object is communicated by the vehicle to a road side unit (RSU) for distribution to other vehicles.

15. The method of claim 14, wherein a part of the sensor derived data is received from the RSU as crowdsourced sensor data from other vehicles.

16. The method of claim 14, wherein a longevity value of the identification of the moving object prevents the RSU from communicating the identification of the moving object to a higher network level.

17. At least one non-transitory machine readable medium comprising information respective of instructions for enhanced electronic navigation maps for a vehicle, the instructions, when executed by processing circuitry, cause the processing circuitry to perform operations comprising:
    receiving, by a vehicle component, a set of map tiles from a remote entity;
    obtaining sensor derived data that has a locality corresponding to a map tile in the set of map tiles;
    invoking a field-programmable gate array (FPGA) of the vehicle to combine the sensor derived data and the map tile and create a modified map tile; and
    communicating the modified map tile to a control system of the vehicle.

18. The at least one non-transitory machine readable medium of claim 17, wherein the sensor derived data includes data from multiple sensors of the vehicle.

19. The at least one non-transitory machine readable medium of claim 18, wherein the operations comprise:
    configuring the FPGA for sensor fusion; and
    invoking the FPGA on the data from the multiple sensors of the vehicle to create at least a part of the sensor derived data.

20. The at least one non-transitory machine readable medium of claim 19, wherein the at least a part of the sensor derived data includes identification of a moving object in an environment observed by the sensors to produce the sensor data.

21. The at least one non-transitory machine readable medium of claim 20, wherein the identification of the moving object includes a longevity.

22. The at least one non-transitory machine readable medium of claim 20, wherein the identification of the moving object is communicated by the vehicle to a road side unit (RSU) for distribution to other vehicles.

23. The at least one non-transitory machine readable medium of claim 22, wherein a part of the sensor derived data is received from the RSU as crowdsourced sensor data from other vehicles.

24. The at least one non-transitory machine readable medium of claim 22, wherein a longevity value of the identification of the moving object prevents the RSU from communicating the identification of the moving object to a higher network level.

* * * * *

UNITED STATES PATENT AND TRADEMARK OFFICE
CERTIFICATE OF CORRECTION

PATENT NO. : 11,151,866 B2
APPLICATION NO. : 16/267648
DATED : October 19, 2021
INVENTOR(S) : Moustafa et al.

Page 1 of 1

It is certified that error appears in the above-identified patent and that said Letters Patent is hereby corrected as shown below:

In the Claims

In Column 17, Line 4, in Claim 6, after "object", insert --is--

In Column 17, Line 24, in Claim 9, delete "tile," and insert --tile-- therefor

Signed and Sealed this
Twenty-first Day of December, 2021

Drew Hirshfeld
*Performing the Functions and Duties of the
Under Secretary of Commerce for Intellectual Property and
Director of the United States Patent and Trademark Office*